Patented July 15, 1952

2,603,628

UNITED STATES PATENT OFFICE 2,603,628

POLYMERIZATION OF VINYL ALLYL ETHER

Maurice Louis Auguste Fluchaire and Georges Collardeau, Lyon, France, assignors to Societe des Usines Chimiques Rhone-Poulenc, Paris, France, a French body corporate No Drawing. Application June 2, 1949, Serial No. 96,822. In France March 3, 1947

5 Claims. (Cl. 260—91.1)

This invention is a continuation-in-part of application No. 3,164 filed January 19, 1948 (abandoned), and relates to the production of polymeric compounds and particularly to the polymerisation of vinyl-allyl ether,

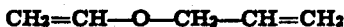

$$CH_2=CH-O-CH_2-CH=CH_2$$

It further relates to the new polymers resulting from such polymerisation and to the use of these polymers.

Because of the presence in vinyl-allyl ether of two double bonds of different character its polymerisation has special characteristics. It has been discovered that if vinyl-allyl ether is subjected to the action of suitable catalysts the polymerisation affects only the vinyl double bond i. e. the allyl double bond is substantially un-affected.

According to the present invention polymers of vinyl-allyl ether are produced by polymerising vinyl-allyl ether in solution by means of a polymerisation catalyst selected from the class consisting of iodine and halides of metals or metalloids which are ansolvo acids.

More particularly according to the invention the polymerisation is effected at a temperature below 38° C.

The term "ansolvo acids" is used in the sense defined by Meerwein, Annalen der Chemie, volume 455, at pages 227 to 253 (1927). Such substances form complexes and liberate hydrogen ions from alcohols, anhydrous hydrogen halides and the like and particular examples suitable for use in the present invention are aluminum chloride, stannic chloride, ferric chloride, boron fluoride and the combinations of this last compound with ether. Suitable solvents for providing the medium in which the polymerisation is effected are, inter alia, esters, ethers and hydrocarbons.

By carrying out the polymerisation below the temperature above stated the polymer obtained has a high molecular weight but in all cases it is soft and soluble in organic solvents. This polymer is characterised by the fact that it retains substantially all the allyl linkages of the original material whereas it has lost substantially all the vinyl linkages. This is evidenced by the iodine number (Hubl) which indicates one double bond for a weight of polymer equal to the molecular weight of vinyl-allyl ether as compared with two in the starting material. It is also evidenced by the absence of aldehyde groups in the hydrolysis product of said polymer, showing the absence of hydrolysable $CH_2=CH-O-$ group.

The degree of polymerisation varies according to the temperature of the polymerisation reaction. The molecular dimensions of these polymers may be determined by measuring their K value. This value is calculated from the viscosity at 20° C. of a solution of 1 or 2 per cent of polymer in benzene, using the Fikentscher equation (Cellulose-Chemie, 1932, 13, 60). The K value of the product is greater for lower polymerisation temperature, all other conditions being the same. The most valuable polymers have a K value of at least 10. Where it is required to produce a polymer having a K value of about 26, a working temperature of 30° C. is suitable. For higher K values, e. g. 80, lower temperatures, e. g. —60° C. are preferred.

Processes have been suggested in prior literature for the polymerisation of doubly unsaturated compounds but these processes have been carried out under totally different conditions and have not in fact been described with specific application to vinyl-allyl ether itself. The products obtained according to the present invention are quite different from the products described in U. S. Patent No. 2,273,891 in that they have all the essential properties of a drying oil; that is to say a solution of the product to which has been added a small quantity e. g. 0.01 to 2% of a siccative, e. g. cobalt naphthenate or resinate, when coated as a thin layer, is transformed on standing in air at ordinary temperature, or in a few minutes at 85° C. to a hard film which neither softens on heating nor dissolves in organic solvents. By applying to vinyl-allyl ether itself the procedure of the U. S. patent referred to above, moreover, there is inevitably formed, in addition to the polymer, pentene-4-aldehyde so that the product has different properties.

The polymers produced by the process of the present invention are generally colourless.

The polymers obtained by the process of this invention can be hardened by the action of air, preferably at increased temperature.

The present invention is illustrated, but is not to be regarded as limited by the following examples in which the parts are by volume except where otherwise stated:

Example I

Into an apparatus provided with a good agitator and cooled to —25° C. are introduced 1 part by weight of freshly distilled vinyl-allyl ether (boiling point 27° C. under an absolute pressure of 172 mm. of Hg.) and 2 parts of an ether solution of boron fluoride containing 0.86% by weight of BF₃. When the polymerisation has commenced the temperature is lowered to —60° C. and 1 part of vinyl-allyl ether and 1 part of catalyst solution are added every 10 minutes over a period of two hours. 20 minutes after the last addition, the cooling bath is removed, and 12 parts of a 17% by weight aqueous solution of potassium carbonate are added to destroy the catalyst. After half an hour the agitator is stopped, the aqueous layer is separated and the ether layer is dried over potassium carbonate. The ether is driven off under a vacuum at room temperature.

The polymer, obtained in an 83% yield, is a very viscous adhesive, colourless mass which is soluble in the usual solvents. On testing with Hubl's solution, it was found to have a double bond of 96 gms., i. e. 96 gms. of the polymer will combine with two gram atoms (254 gms.) of iodine. Value of $K=79$.

Example II 9 parts of vinyl-allyl ether are placed in a spherical flask provided with an agitator and cooled with a salt-ice mixture.

20 parts of a 0.2% by weight solution of ferric chloride in benzene, are gradually added. After a few minutes, the temperature suddenly rises to 37° C. One hour after the return to normal temperature the solvent is removed by distillation on a water bath, and the residue is dried in vacuo at room temperature. A viscous yellow-coloured liquid is obtained in a yield of 91%. $K=18$.

Example III

A thin layer of an unsaturated polymer prepared as described in Example II is allowed to stand in the air. After several hours at 80° C. or after several days at room temperature, a hard and insoluble film is obtained, which adheres well to the support. In the presence of a siccative, for example in the presence of 1% of cobalt resinate, drying at room temperature only takes 5 to 10 hours.

Example IV

Into a spherical flask provided with means for agitation and immersed in a bath of ice water are simultaneously introduced, at intervals of 45 seconds, 5 cc. of vinyl-allyl ether, and 2.5 cc. of a 2% solution of the ether compound or boron fluoride in ethyl acetate. In 50 minutes, 257 g. (320 cc.) of vinyl-allyl ether and 160 cc. of catalyst solution are thus mixed, the temperature having been maintained at between 30° C. and 35° C. Agitation is continued for 10 minutes, the aqueous layer is separated and the upper layer is saturated with sodium carbonate. The sodium carbonate is then removed by filtration.

The polymer obtained has a K-value of 26. On testing with Hubl's solution, the polymer was found to have a double bond for 88 gms.

Example V

To the solution of vinyl-allyl ether polymer in ethyl acetate, prepared in accordance with Example IV, is added 1% of cobalt resinate (calculated on the weight of the polymer). When spread on wood by means of a brush or by spraying and exposed to the air for two hours at 50° C., it gives a shiny film which adheres strongly and no longer sticks to the finger.

After drying for 8 hours at 50° C., a second layer can be superimposed. The maximum hardness is reached after drying for 16 hours.

Example VI

To a toluene solution of a vinyl-allyl ether polymer prepared in accordance with Example I are added cyclohexanone, 1% of cobalt resinate and 30% of titanium dioxide. This mixture is spread on soft sheet steel. After 5 hours at room temperature, a film is obtained which no longer sticks to the finger. The maximum hardness is obtained in 24 or 48 hours, according to the thickness of the layer. In the absence of any siccative agent, the layer takes a week to dry.

We claim:

1. Process for the production of polymeric materials which comprises subjecting a solution containing vinyl-allyl ether as the sole polymerisable substance to the action of a polymerisation catalyst selected from the class consisting of iodine, aluminum chloride, stannic chloride, ferric chloride, boron fluoride and combinations of boron fluoride with ether.

2. Process for the production of polymeric materials which comprises subjecting a solution containing vinyl-allyl ether as the sole polymerisable substance to the action of a polymerisation catalyst selected from the class consisting of iodine, aluminum chloride, stannic chloride, ferric chloride, boron fluoride and combinations of boron fluoride with ether, at a temperature below 38° C.

3. Process for the production of polymeric materials which comprises subjecting a solution containing vinyl-allyl ether as the sole polymerisable substance to the action of boron trifluoride at a temperature below 38° C.

4. A homopolymer of vinyl-allyl ether in which the vinyl groups are polymerised but the allyl groups are unpolymerised, the said polymer having a K-value in benzene of at least 10, being soluble in organic solvents and being capable of being hardened on exposure to oxygen.

5. A homopolymer of vinyl-allyl ether in which the vinyl groups are polymerised but the allyl groups are unpolymerised, the said polymer having a K-value in benzene of at least 10, being soluble in organic solvents and being capable of being hardened on exposure to oxygen at elevated temperature.

MAURICE LOUIS AUGUSTE FLUCHAIRE.
GEORGES COLLARDEAU.

REFERENCES CITED

The following references are of record in the file of this patent:

UNITED STATES PATENTS

| Number | Name | Date |
| --- | --- | --- |
| 2,020,703 | Schumann et al. | Nov. 12, 1935 |
| 2,273,891 | Pollack et al. | Feb. 24, 1942 |
| 2,318,959 | Muskat et al. | May 11, 1943 |
| 2,332,895 | D'Alelio | Oct. 26, 1943 |
| 2,450,234 | Evans et al. | Sept. 28, 1948 |
| 2,513,820 | Schildknecht | July 4, 1950 |

OTHER REFERENCES

Schildknecht et al.: Ind. & Eng. Chem., February 1947, pp. 180–186.